United States Patent [19]

Oda et al.

[11] Patent Number: 4,810,585
[45] Date of Patent: Mar. 7, 1989

[54] METAL-CERAMIC COMPOSITE BODIES AND A METHOD FOR MANUFACTURING THE SAME

[75] Inventors: Isao Oda, Nagoya; Nobuo Tsuno, Kasugai, both of Japan

[73] Assignee: NGK Insulators, Ltd., Nagoya, Japan

[21] Appl. No.: 25,199

[22] Filed: Mar. 12, 1987

[30] Foreign Application Priority Data

Mar. 20, 1986 [JP] Japan .................................. 61-62490

[51] Int. Cl.⁴ .......................... F16B 4/00; F01D 5/00; F02F 7/00
[52] U.S. Cl. .................................. 428/469; 428/698; 428/472; 29/469.5; 29/505
[58] Field of Search ............... 428/133, 137, 469, 472, 428/698, 699; 29/469.5, 505

[56] References Cited

FOREIGN PATENT DOCUMENTS 0142334  8/1984  European Pat. Off. .
156484   2/1985  European Pat. Off. .
0139406  9/1985  European Pat. Off. .

*Primary Examiner*—Nancy A. B. Swisher
*Attorney, Agent, or Firm*—Parkhurst, Oliff & Berridge

[57] ABSTRACT

Metal-ceramic composite bodies are disclosed which each comprise a metallic member and a ceramic member. The metallic member is integrally connected to the ceramic member by fitting the ceramic member itself or a projection formed on the ceramic member into a recess or a through hole formed in the metallic member. The hardness of a metallic portion of including at least a fitted portion between the metallic member and the ceramic member is not less than HRC 38. The roughness of the inner surface of the faces of the through hole of the metallic member at the fitted portion is not more than 8 μm at the maximum height ($R_{max}$) or not more than 0.5 μm at the center line average roughness ($R_a$). A process for manufacturing the same is also disclosed.

6 Claims, 4 Drawing Sheets

METAL-CERAMIC COMPOSITE BODIES AND A METHOD FOR MANUFACTURING THE SAME

BACKGROUND OF THE INVENTION (1) Field of the Invention

The present invention relates to metal-ceramic composite bodies and a method for manufacturing the same. More particularly, the invention relates to metal-ceramic composite bodies having great resistance to fatigue fracture in which a metallic member is connected to a ceramic member through fitting.

(2) Related Art Statement

Since ceramics such as zirconia, silicon nitride and silicon carbide have excellent mechanical strength, heat resistance, wear resistance, and corrosion resistance, they have been noted as high temperature structural materials or wear resistant materials for gas turbine engine parts, engine parts, etc. However, since the ceramic materials are generally hard and brittle, their formability is poor as compared with metallic materials. Further, since the ceramics have poor toughness, resistance against impulsion forces is weak. For this reason, it is difficult to form practical mechanical parts such as engine parts from ceramic materials only. In general, ceramics are used in a form of composite structures in which a metallic member and a ceramic member are joined together. As methods for forming such composite structures through joining metallic members and ceramic members, there is known a method for integrating the metallic member and the ceramic member by fitting the ceramic member or a projection formed thereon into a recess or a through hole formed in the metallic member. However, in order that the composite structural bodies may be used as mechanical parts such as engine parts, the metallic members constituting the composite structural bodies are required to have good mechanical strength and wear resistance.

Since fatigue of a majority of the metallic materials generally more often develops and progresses from their surfaces, the rougher a surface finishing degree, the lower a fatigue limit. Further, the higher the strength of the material, the lower the fatigue limit. (Hajime Nakazawa, and Hirotomi Honma, "Fatigue strength of metals" Yokendo Co., Ltd., pp. 46). Therefore, in the case of metal-ceramic composite bodies having the structure in which a projection formed on a ceramic member is fitted into a recess or a through hole formed in a metallic member, a tensile stress always acts upon the metallic member at a fitted portion. Accordingly, if the metallic member is constituted by a metallic material having a high strength, it is liable to fracture due to fatigue. Further, if a flaw or a defect is present in a portion of the metallic member upon which the tensile stress acts, stress concentrates there. Thus, there is a possibility that the fatigue fracture occurs even under a low tensile stress. Consequently, it has been necessary to control the roughness of the inner surface of the metallic member at the fitted portion to prevent the fatigue fracture in the case of the metal-ceramic composite bodies having the construction that the ceramic member or a projection formed thereon is fitted into a recess or a through hole formed in the metallic member.

SUMMARY OF THE INVENTION

Under these circumstances, it is a first object of the present invention to provide metal-ceramic composite bodies using a metallic material of a high strength, said metal-ceramic composite bodies having a great resistance to fatigue fracture and a large joining force between a metallic member and a ceramic member, as well as a manufacturing process thereof.

It is a second object of the present invention to provide metal-ceramic composite bodies in which a metallic member has an excellent wear resistance, and a manufacturing method thereof.

According to the present invention, there is a provision of a metal-ceramic composite bodies wherein a ceramic member or a projection formed thereon is fitted into a recess or a through hole formed in a metallic member; the hardness of the metallic portion including at least the fitted portion of the metallic member constituting the composite body is not less than HRC 38; and the roughness of the inner surface of the recess or the through hole of the metallic member constituting the fitted portion is not more than 8 $\mu$m at the maximum height ($R_{max}$) or not more than 0.5 m at the center line average roughness ($R_a$).

According to another aspect of the present invention, there is a provision of a method of manufacturing metal-ceramic composite bodies, which comprises fitting a ceramic member or a projection formed thereon into a recess or a through hole formed in a metallic member composed of a precipitation hardening alloy having undergone no precipitation hardening, at a temperature lower than a precipitation hardening start temperature of the precipitation hardening alloy, to form a metal-ceramic composite body in which the roughness of the inner surface of the recess or the through hole of the metallic member constituting the fitted portion is 8 $\mu$m or less at the maximum height ($R_{max}$) or 0.5 $\mu$m or less at the center line average roughness ($R_a$), and hardening the metallic member constituting the fitted portion of the composite body through heat treatment so that the metallic portion including at least the fitted portion of the metallic member constituting the composite body is set at not less than HRC 38.

The ceramic-metal composite bodies according to the present invention can be advantageously used as structural members which undergo high temperatures and/or repeated loads, for instance, engine parts.

These and other objects, features and advantages of the invention will be well appreciated upon reading the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1:
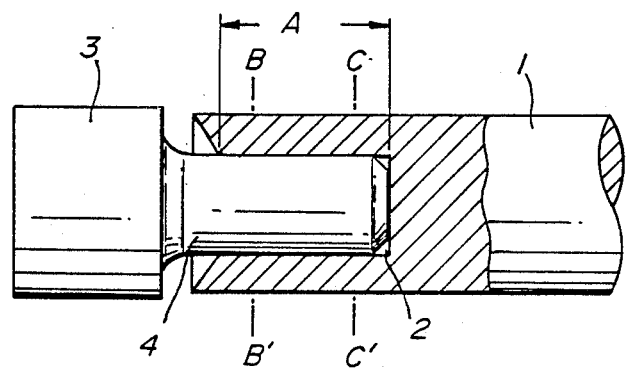
FIG. 1 is a partially cross sectional view illustrating an embodiment of the metal-ceramic composite body according to the present invention.

In the metal-ceramic composite body according to the present invention which is obtained by joining the metallic member and the ceramic member through fitting, while the metallic member constituting the fitted portion of the metal-ceramic composite body is made of a metallic material having such a high strength that the tensile strength is not less than 125 kgf/mm$^2$ or a hardness is not less than HRC 38, the roughness of the inner surface of the metallic member at the fitted portion is restricted such that the maximum height ($R_{max}$) is not more than 8 μm, the center line average roughness ($R_a$) is not more than 0.5 μm and the depth of flaws present in the inner surface is not more than 10 μm. Thereby, dangerous fatigue fracture of the metallic member can be reduced to a large extent. Further, since the above metallic member is made of a precipitation hardening alloy and the fitted portion between the metallic member and the ceramic member is formed by press fitting the ceramic member or a projection formed on the ceramic member into a recess or a through hole provided in the precipitation hardening alloy metallic member having no precipitation hardening, it was found that the roughness and the depth of the flaws at the inner surface of the metallic member at the fitted portion can be suppressed lower than the above-restricted ranges by limiting the press-fitting temperature at not more than a precipitation hardening start temperature of the precipitation hardening alloy. The present invention is based on the above acknowledgement.

According to the present invention, when the metallic member constituting the fitted portion is made of a high strength metallic material having a tensile strength of not less than 125 kgf/mm$^2$ or a hardness of not less than HRC 38, the roughness of the inner surface of the fitted portion of the metallic member is limited to not more than a specific value to prevent the fracture of the metallic member due to fatigue. The surface roughness (the maximum height) is not more than 8 μm $R_{max}$, and preferably not more than 4 μm $R_{max}$, and more preferably not more than 2 μm $R_{max}$. The surface roughness (the central line average roughness) is not more than 0.5 μm $R_a$, preferably not more than 0.3 μm $R_a$, and more preferably not more than 0.2 μm $R_a$. If the surface roughness exceeds the above limits, the metallic member is unfavorably liable to fracture at the fitted portion due to the fatigue. The depth of the flaws present in the inner surface of the fitted portion of the metallic member is preferably not more than 10 μm, more preferably not more than 5 μm and most preferably not more than 2 μm. If the depth of the flaws is more than 10 μm, the fitted portion is liable to fracture due to the fatigue when the strength or the hardness of the metallic member constituting the fitted portion is over the respective value specified in the present invention. Thus, such a depth is not favorable. The flaws include working flaws which are formed by working the recess or the through hole in the metallic member and remain after the fitting, and flaws produced during the fitting. At which ranges the degree of the surface roughness and the depth of the flaws are to be set within the above values may be determined depending upon an interference of the fitted portion and the strength or the hardness of the metallic member constituting the fitted portion. In the metal-ceramic composite body having the structure according to the present invention, the larger the fitting interference, the more increased the residual tensile stress always acting upon the metallic member at the fitted portion. On the other hand, the larger the strength or the hardness of the metallic member, the more liable is the metallic member to fracture due to fatigue. Therefore, in the present invention, as the interference and the strength or the hardness of the metallic member increase, the surface roughness and the allowable depth of the flaws are set lower.

Furthermore, in the metal-ceramic composite body according to the present invention, the roughness of the inner surface of the recess in the metallic member is controlled before the fitting depending upon the fitting method between the metallic member and the ceramic member. For instance, when the fitting is a shrinkage fitting or an expansion fitting, the surface roughness and the depth of the flaws at the inner surface of the recess in the metallic member before the fitting are set within the ranges of the present invention. This is because since the inner surface of the recess in the metallic member undergoes almost no plastic deformation during the fitting in the case of the shrinkage fitting or the expansion fitting, the surface state of the inner surface of the recess in the metallic member before the fitting is a surface state of the inner surface of the recess in the metallic member constituting the fitted portion. On the other hand, when the fitting is carried out by the fitting or press fitting in which the inner surface of the recess in the metallic member undergoes a plastic deformation, the roughness of the inner surface of the recess in the metallic member constituting the fitted portion is improved by the press-fitting under specific conditions as compared with the surface roughness before the fitting. For this reason, since the roughness of the inner surface of the recess in the metallic member constituting the fitted portion is improved by the press-fitting when the fitting is carried out by the press-fitting under the conditions specified in the present invention, the press-fitting may be carried out by using a metallic member having the surface roughness and the depth of the flaws at the inner surface of the recess in the metallic member falling outside the ranges of the present invention. In this case, the surface state of the inner surface of the recess in the metallic member before the press-fitting is adjusted depending upon the plastic deformation amount of the inner surface of the recess in the metallic member during the press-fitting. The plastically deformed amount is proportional to the interference in the press-fitting, that is, the difference between the inner diameter of the recess of the metallic member before the press-fitting and the outer diameter of the ceramic member or the diameter of the projection of the ceramic member before the press-fitting. The larger the interference, the larger the plastically deformed amount of the recess of the metallic member. However, when the fitting is carried out by press-fitting, any countermeasure is necessary to prevent flaws due to the press-fitting from being formed on the inner surface of the recess in the metallic member. For this purpose, according to the present invention, a material serving as a lubricant is interposed between the inner surface of the recess in the metallic member and the outer surface of the ceramic member or the surface of the projection of the ceramic member, or the press-fitting is carried out while the deforming resistance of the recess of the metallic member is adjusted. For instance, when the metallic member is made of a non-precipitation hardening alloy, the press-fitting temperature is increased to reduce deformation resistance of the metallic member. On the other hand, when the metallic member is made of the precipitation hardening alloy, the alloy having undergone a solution treatment is used. The press-fitting is effected preferably at not more than a precipitation hardening start temperature of the precipitation hardening alloy, more preferably at a temperature between the room temperature and the precipitation hardening start temperature, and most preferably at room temperature. When the metallic member is made of the precipitation hardening alloy having undergone no precipitation hardening treatment and the press-fitting is performed at not less than the precipitation hardening start temperature, the precipitation hardening occurs during the press fitting, so that the deformation resistance of the metallic member increases to cause the flaws such as "bite" at the press-fitted portion and increase the surface roughness. Therefore, such a press-fitting is unfavorable.

In the metallic-ceramic composite bodies according to the present invention, the hardness of the metallic member constituting the fitted portion is set at not less than HRC 38. If the hardness is less than HRC 38, the strength and the wear resistance of the metallic member become unfavorably insufficient.

Next, the present invention will be explained in more detail with reference to the attached drawings. However, these examples are merely given to illustrate the invention, but should never be interpreted to limit the scope of the invention.

Figure 2:
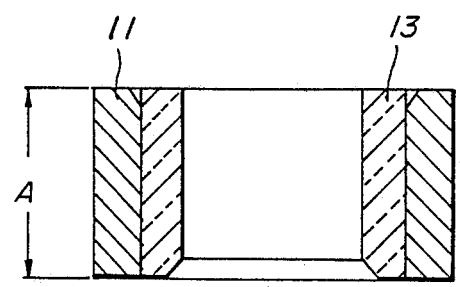
FIG. 2 is a sectional view illustrating another embodiment of the metal-ceramic composite body according to the present invention.

FIGS. 1 and 2 show constructions of embodiments of the metallic-ceramic composite bodies according to the present invention.

Figure 3:
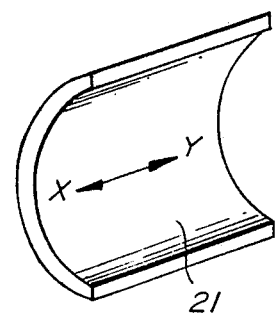
FIG. 3 is a perspective view of a metallic piece taken from a fitted portion of the metal-ceramic composite body according to the present invention for measuring the surface roughness.

FIG. 1 is a partially sectional view of an embodiment of the metal-ceramic composite body according to the present invention in which a projection 4 formed on the ceramic member 3 is fitted into a recess 2 formed in the metallic member 1. FIG. 2 is a sectional view of another embodiment of the metal-ceramic composite body according to the present invention in which a ring-like ceramic member 13 having a center through hole is fitted into a through hole formed in the center of a ring-like metallic member 11. In the metal-ceramic composite body according to the present invention, the hardness of the metallic portion corresponding to at least an A zone shown in FIGS. 1 and 2 is not less than HRC 38, and the surface roughness of the recess 2 which is in contact with the projection 4 in the A zone or the roughness of the inner surface of the metallic member 11 which contacts the outer surface of the ceramic member 13 is not more than 8 $\mu$m $R_{max}$ or not more than 0.5 $\mu$m $R_a$. The above surface roughnesses are values measured by the following method. That is, when the metal-ceramic composite body has a construction shown in FIG. 1, the A zone is cut along B-B' and C-C' to obtain a composite column having an outer cylindrical metallic member and an inner cylindrical ceramic member. This composite column is then diametrically cut to separate the metallic member from the ceramic member and obtain a semi-circular metallic piece as shown in FIG. 3. In the case of the metal-ceramic composite body having the structure shown in FIG. 2, the metal-ceramic composite body is diametrically cut to separate the metallic member 11 from the ceramic member 13 and obtain a semi-cylindrical metallic piece as shown in FIG. 3. Thereafter, with respect to the inner surfaces of the thus obtained metallic pieces, the roughness of the inner surface of the metallic piece is measured, for instance, in an X-Y direction, by a method specified in JIS B-0601.

A Rockwell hardness or Vickers hardness is preferably employed in the present invention as means to indicate the strength of the metallic member. As compared with the measurement of the tensile strength, the above mentioned hardness measurements can be easily performed, and further limitation due to the profile of the test piece is smaller.

In order to enhance the wear resistance of the surface of the metallic member, in the metal-ceramic composite body according to the present invention, a part or the whole part of the outer surface of the metallic member may be further hardened by hardening or nitriding the surface of the metallic member. The surface hardening is carried out after the hardness of the inside of the metallic member is adjusted to a specific value. On the other hand, when the metallic member is made of the precipitation hardening alloy, determination is made as to whether the nitriding is carried out simultaneously with or separately from the precipitation hardening treatment with due consideration of the nitriding temperature and the precipitation hardening temperature. For instance, when the nitriding temperature is equal to the precipitation hardening temperature, the nitriding treatment may be simultaneously performed with the precipitation hardening treatment. However, when the nitriding temperature is lower than the precipitation hardening temperature, it is preferable that the precipitation hardening treatment precedes the nitriding treatment.

Next, embodiments of the present invention will be explained in more detail with reference to the attached drawings.

Figure 4:
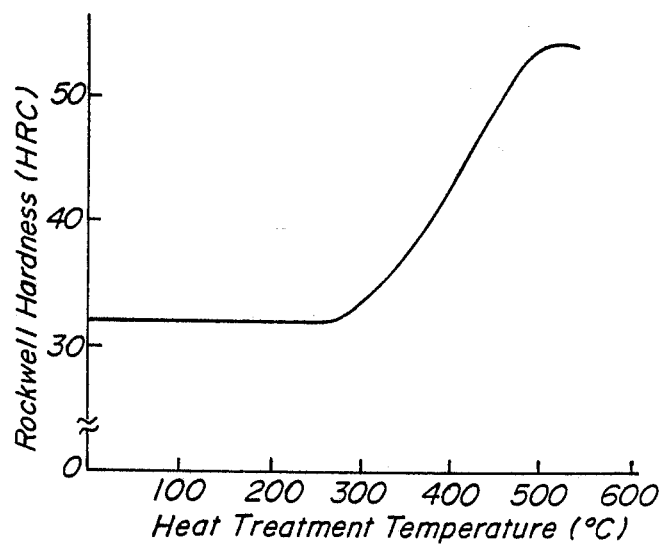
FIG. 4 is a characteristic diagram showing the relationship between the heat treatment temperature and the hardness of the metallic member.

FIG. 4 shows results of hardness measurements with respect to a 18% Ni maraging steel, as a kind of precipitation hardening alloys, which has been maintained at various temperatures between 100° C. and 550° C. for 1 hour after a solution treatment and then cooled in air. As obvious from FIG. 4, the 18% Ni maraging steel begins to harden at not less than 300° C. through precipitation.

Figure 5:
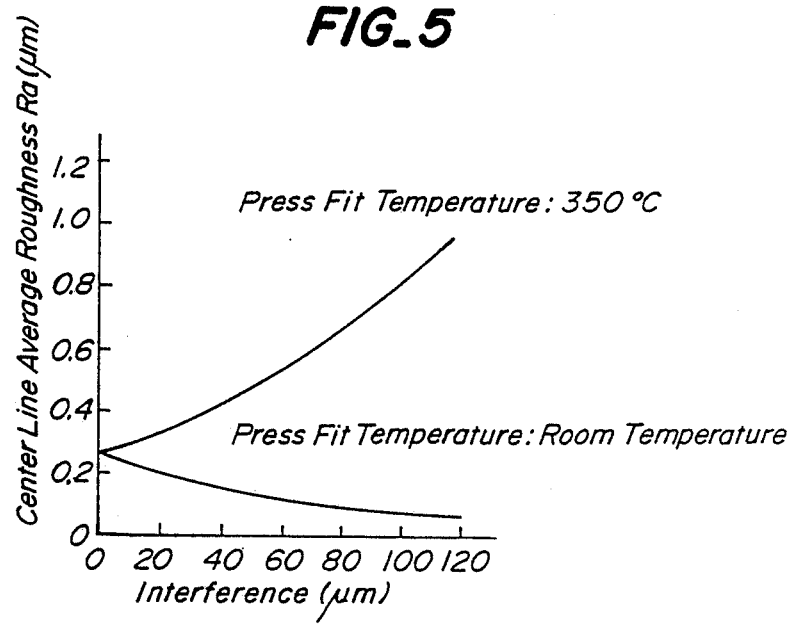
FIG. 5 is a characteristic diagram showing the relationship between the press-fitting interference and the roughness of the inner surface of the metallic member after the press-fitting at different press-fitting temperatures.

FIG. 5 is a characteristic diagram illustrating the relationship between a press-fitting interference and a roughness of an inner surface of a recess in a metallic member constituting the press-fitted portion when the metal-ceramic composite body according to the present invention was obtained by press-fitting a projection provided in a ceramic member into a recess formed in a metallic member made of the above 18% Ni maraging steel at room temperature or 350° C. The surface roughness was determined by the following method. First, metallic members which were made of a 18% Ni maraging steel round bar, of 12.2 mm in diameter, having undergone a solution treatment and had a recess of an inner diameter of 10 mm and a depth of 20 mm at one end thereof as well as ceramic members having projections of various diameters, larger than the inner diameter of the recess, at one end of a silicon nitride round bar were prepared.

The metal-ceramic composite body was prepared by press-fitting the projection of the ceramic member into the recess of the metallic member at room temperature or 350° C. The metal-ceramic composite bodies were precipitation hardened at 500° C. for 3 hours to adjust the hardness of the metallic member to HRC 55. Thereafter, the press-fitted portion was cut to separate the metallic member from the ceramic member, and the roughness of the inner surface of the recess in the metallic member constituting the fitted portion was measured in a direction parallel with the axial direction thereof. As obvious from FIG. 5, when the press-fitting temperature is room temperature, the surface roughness decreases as the interference increases. To the contrary, when the press-fitting temperature is 350° C., the surface roughness increases with increase in the interference. In FIG. 5, when the interference is zero, the surface roughness denotes the surface roughness of the inner surface of the recess in the metallic member before the press-fitting.

As obvious from FIGS. 4 and 5, when the press-fitting temperature is lower than a precipitation hardening start temperature of the metallic member, the surface roughness of the inner surface of the metallic member constituting the press-fitted portion is improved as compared with the surface roughness of the same portion before the press-fitting. To the contrary, when the press-fitting temperature is higher than the precipitation hardening start temperature of the metallic member, the roughness of the inner surface of the recess in the metallic member is deteriorated as compared with the surface roughness of the same portion before the press-fitting. The above phenomenon is a common phenomenon with respect to all the other precipitation hardening alloys including not only the above maraging steel but also austenitic alloys such as Incoloy 903. Therefore, when the precipitation hardening alloy is used as the metallic member, the precipitation hardening start temperature is determined as shown in FIG. 4 and the press-fitting is carried out at not higher than the thus determined temperature. By so doing, the roughness of the inner surface of the recess in the metallic member constituting the fitted portion can be adjusted to the surface roughness specified in the present invention through the press-fitting at not more than the thus determined temperature.

Figure 6:
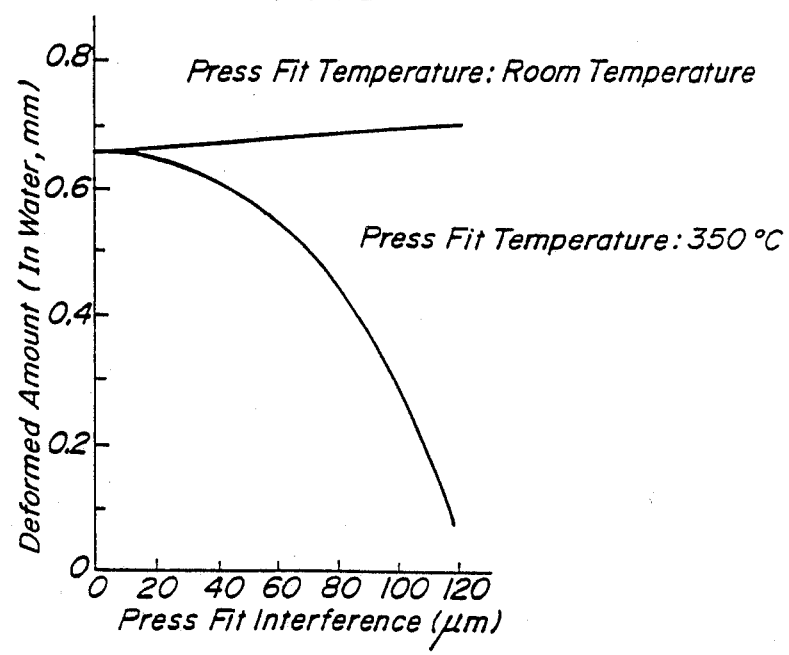
FIG. 6 is a characteristic diagram showing the relationship between the press-fitting interference and the deformed amount in test pieces taken from the composite bodies having undergone press-fitting at different temperatures.
Figure 7:
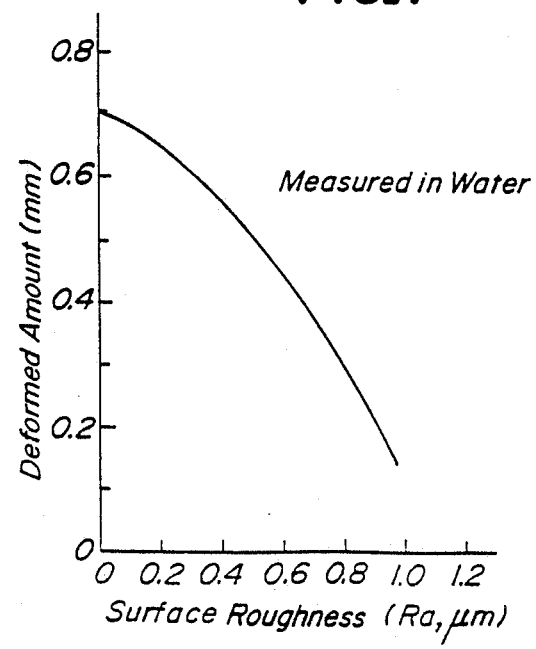
FIG. 7 is a characteristic diagram showing the relationship between the roughness of an inner surface and the deformed amount in test pieces sampled from the fitted portions.
Figure 8:
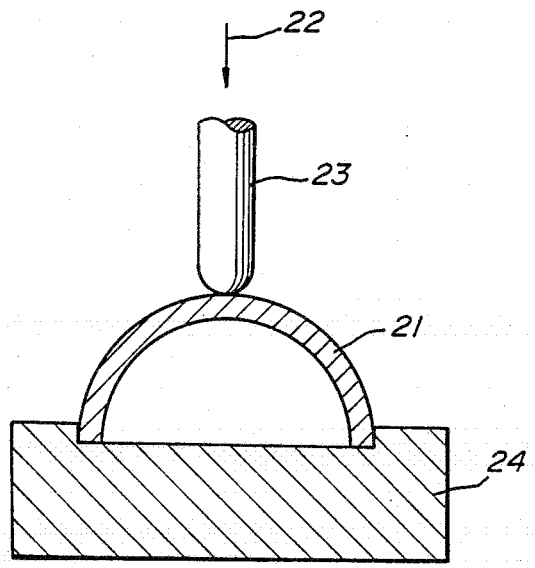
FIG. 8 is a view illustrating a method of measuring a deformed amount of a metallic piece sampled from a fitted portion of the metal-ceramic composite body according to the present invention.

FIGS. 6 and 7 are characteristic diagrams illustrating the relationship between the mechanical characteristics of the metallic member constituting the fitted portion of the composite body and the interference or the roughness of the inner surface of the recess in the metallic member with respect to the metal-ceramic composite bodies in which a cylindrical projection formed on a ceramic member is integrally press-fitted into a cylindrical recess formed in the metallic member. The above mechanical characteristics were evaluated by the below-mentioned method. First, the fitted portion of the composite body was cut in a ring-like fashion to obtain a composite column consisting of an outer metallic member and an inner ceramic member. Then, the thus obtained column is diametrically cut to separate the metallic member from the ceramic member, thereby sampling a semi-cylindrical metallic piece 21. Thereafter, a compression load 22 is applied to the metallic piece 21 as shown in FIG. 8, and a descending distance of an upper press jig 23 is measured until the metallic piece breaks. The descending distance was taken as a deformed amount of the metallic piece. In this test, the larger the deformed amount of the metallic piece until the metallic piece breaks, the more excellent the mechanical characteristics, particularly the ductility. This test was performed in water.

FIG. 6 shows the deformation amount (in water) at an ordinated vs. the press-fitting interference at an abscissa measured with respect to metal pieces sampled from fitted portions of composite bodies prepared by the same method as in the metal-ceramic composite bodies used in the test in FIG. 5. As obvious from FIG. 6, the deformed amount of the metallic piece taken from the fitted portion of the composite bodies press-fitted at room temperature slightly increases with the increase in the interference. To the contrary, the deformed amount of the metallic piece taken from the fitted portion of the composite body press-fitted at 350° C. decreases when the interference increases. As having been described in FIG. 5, the effect of the different press-fitting temperatures upon the deformed amount varies depending upon the roughness of the inner surface of the metallic piece.

FIG. 7 is a diagram showing the relationship between a surface roughness ($R_a$) of the inner surface prior to the deformation test at an abscissa vs. a deformed amount at an ordinate with respect to metallic pieces sampled from fitted portions of metal-ceramic composite bodies prepared by the same method as those used in the test in FIG. 5. In FIG. 7, metallic pieces having the center line average roughness of not less than 0.3 $\mu$m $R_a$ are those taken from the composite bodies press-fitted at 350° C.

As shown in FIG. 7, while the deformed amount decreases with increase in the surface roughness, it rapidly decreases when the center line average roughness is more than 0.5 $\mu$m $R_a$. As evident from FIG. 7, according to the metal-ceramic composite bodies in which the metallic member and the ceramic member are integrally joined together by press-fitting the projection formed on the ceramic member into the cylindrical recess formed in the metallic member, the ductility is unfavorably lowered when the roughness of the inner surface of the recess in the metallic member constituting the fitted portion becomes higher than a specific value.

EXAMPLE 1

A metallic member was prepared from a solution-treated 18% Ni maraging steel round bar of a diameter of 12.2 mm with a recess of 10.0 mm in inner diameter and a depth of 20 mm at one end thereof. A ceramic member was prepared from a silicon nitride round bar of a diameter of 12 mm according to a pressureless sintering method with a projection of a diameter of 10.1 mm and a length of 21 mm. A metal-ceramic composite body in which the metallic member was integrally connected to the ceramic member was prepared by press-fitting the projection of the ceramic member into the recess of the metallic member at room temperature or 350° C. The metal-ceramic composite body was subjected to a precipitation hardening treatment at 500° C. for 3 hours to adjust the hardness of the metallic member to HRC 55. The outer surface of the metallic member having undergone the precipitation hardening was finished to a diameter of 12 mm, thereby obtaining a test composite body.

The coefficients of thermal expansion of the maraging steel and the silicon nitride constituting the test composite body are $12.6 \times 10^{-6}/°$ C. and $3.3 \times 10^{-6}/°$ C., respectively. Therefore, when the test composite body is kept at low temperatures, a tensile stress can be generated in the fitted portion of the maraging steel due to the difference in shrinkage amount between them.

Then, a heat fatigue test between the liquid nitrogen temperature and room temperature was carried out by using the test composite body. That is, after the test composite body was thrown into liquid nitrogen and then kept therein for a specific time period, it was then returned to room temperature. This operation was repeated and the surface of the fitted portion was inspected every 50 times of repetition.

As a result, cracks were observed at the surface of the fitted portion at 500 times of repetition in the case of a test composite body press-fitted at 350° C., while to the contrary, no abnormality was observed in the test piece press-fitted at room temperature even at 1000 times of repetition.

EXAMPLE 2

A ceramic member was prepared by forming a projection of a diameter of 10.1 mm and a length of 21 mm on one tip end of a shaft portion of a turbine rotor in which a vane wheel and the shaft portion were integrally formed with silicon nitride according to a pressureless sintering process. A metallic member was prepared by forming a recess of an inner diameter of 10.0 mm and a depth of 20 mm at one end of a 18% Ni maraging steel round bar of a diameter of 12.2 mm having undergone a solution treatment. A metal-ceramic composite body in which the metallic member was integrally connected to the ceramic member was prepared by press-fitting the projection of the ceramic member into the recess in the metallic member at room temperature. The metal-ceramic composite body thus obtained was subjected to the precipitation hardening treatment at 500° C. for 3 hours to adjust the hardness of the metallic member to HRC 55. Then, the outer surface of the precipitation hardened metallic member was finished to a specific profile to produce a turbocharger turbine rotor (hereinafter referred to as test piece A) which had the hardness and the roughness of the inner surface of the recess in the metallic member constituting the fitted portion within the ranges of the present invention. A turbocharger turbine rotor (hereinafter referred to as test piece B) in which the hardness of the metallic member constituting the fitted portion was HRC 32 outside the range of the present invention and the roughness of the inner surface of the recess was inside the range of the present invention was prepared by finishing the outer surface of the metallic member to a specific profile without precipitation hardening the metal-ceramic composite body.

After the turbocharger turbine rotor was assembled into a high temperature rotary tester, a rotary test was carried out at a speed of revolution of 150,000 rpm in a combustion gas for 500 hours. Then, after a rotary test at 150,000 rpm for 500 hours by using a combustion gas, the outer surface of the fitted portion of the metallic member was inspected, but no abnormality was observed in the test piece A. To the contrary, a bearing-abutting face in the test piece B was excessively abraded.

As mentioned in the above, the metal-ceramic composite body in which the hardness of the outer surface of the metallic shaft is lower than the range specified in the present invention is not preferable because of the insufficient abrasion resistance of the metallic shaft.

The present invention is not limited to the above-specified embodiments, and various deformation and changes can be done. For instance, although the silicon nitride was used in the above-mentioned embodiments as the ceramic members, ceramics such as silicon carbide, sialon, alumina, zirconia, etc. may be used depending upon use purpose. As the metallic member, use may be made of precipitation hardening alloys such as the maraging steel, precipitation hardening stainless steels, precipitation hardening heat resistant steels, precipitation hardening super alloys, etc., chromemolybdenum steel, nickel-chrome-molybdenum steel, martensitic stainless steel, etc.

The present invention is effective to enhance the resistance against the fatigue fracture as well as the resistance against stress corrosion cracking and the delayed fracture.

Furthermore, in the embodiments illustrated in the above, explanation was made of the metal-ceramic composite bodies in which the projection formed in the ceramic member was fitted into the recess formed in the bar-like metallic member, but as obvious from the gist of the present invention, similar and same results can be naturally obtained with respect to the metal-ceramic composite bodies in which a ring-like metallic member is fitted around the outer periphery of a ring-like ceramic member.

As explained in the foregoing, since the metal-ceramic composite body according to the present invention in which the ceramic member or the projection formed thereon is fitted into the recess or the through hole formed in the metallic member has the roughness of the inner surface of the recess or the through hole in the metallic member being less than the specific value, the fatigue fracture does not occur even when the metallic member constituting the fitted portion is made of a metallic material having high hardness and excellent wear resistance.

Accordingly, when the turbocharger rotor in which a part of a turbine wheel and a turbine shaft is constituted by silicon nitride ceramic and the remaining portion is made of a metal having a higher strength is constituted by metal-ceramic composite body according to the present invention, a high efficiency turbocharger having excellent response and durability can be obtained.

In addition, when a valve seat insert having the structure that a metallic ring is fitted around the outer periphery of a silicon nitride ring and a valve contact face is made of ceramics is constituted by the metal-ceramic composite body according to the present invention, the valve seat insert having an excellent wear resistance can be obtained.

As mentioned in the above, the metal-ceramic composite bodies according to the present invention can be used as engine parts such as turbocharger rotors, gas turbine rotors, or valve seat inserts and structural parts which undergoes repeated high temperature or repeated load by utilizing the excellent heat resistance, wear resistance and high strength of the ceramics, and the composite bodies render them excellent in durability.

What is claimed is:

1. A metal-ceramic composite body comprising a metallic member having a hardness of not less than HRC 38 and having a recess or a through hole formed therein and a ceramic member having a projection formed thereon, said metallic member being interally connected to the ceramic member while the ceramic member or said projection of the ceramic member is fitted into the recess or the through hole of the metallic member, wherein the roughness of the inner surface of the recess or the through hole of the metallic member constituting the fitted portion is not more than 8 μm at the maximum height ($R_{max}$) or not more that 0.5 μm at the center line average roughness ($R_a$).

2. A metal-ceramic composite body according to claim 1, wherein the metallic portion including at least the fitted portion of the metallic member constituting the composite body is made of a precipitation hardening alloy.

3. A metal-ceramic composite body according to claim 1, wherein the hardness of at least a part of the outer surface of the metallic portion of the metallic member constituting the composite body is greater than that of the inner surface.

4. A process for manufacturing a metal-ceramic composite body, which comprises the steps of: fitting a ceramic member or a projection formed on the ceramic member into a recess or a through hole formed in a metallic member of a precipitation hardening alloy which is in a pre-precipitation hardened state, at a perataure not higher than a precipitation hardening start temperature of said precipitation hardening alloy, to form a metal-ceramic composite body in which the roughness of an inner surface of the recess or the through hole of the metallic member constituting a fitted portion between the metallic member and the ceramic member is not more than 8 μm at the maximum height ($R_{max}$) or not more than 0.5 μm at the center line average roughness ($R_a$); and hardening the metallic member constituting the fitted portion of the composite body through a heat treatment to adjust the hardenss of the metallic member portion including at least the fitted portion of the metallic member constituting the composite body to not less than HRC 38.

5. A process for manufacturing a metal-ceramic composite body according to claim 4, wherein the ceramic member or the projection of the ceramic member is fitted into the recess or the through hole of the metallic member through press-fitting.

6. A process for manufacturing a metal-ceramic composite body according to claim 4, wherein the metallic member constituting the fitted portion of the metal-ceramic composite body is hardened through at least one treatment selected from the group consisting of precipitation hardening and surface hardening.

* * * * *